US010099499B2

(12) United States Patent
Iwata et al.

(10) Patent No.: US 10,099,499 B2
(45) Date of Patent: Oct. 16, 2018

(54) THERMOSENSITIVE RECORDING MATERIAL

(71) Applicants: Daiki Iwata, Shizuoka (JP); Takeshi Kajikawa, Shizuoka (JP); Hideo Aihara, Kanagawa (JP)

(72) Inventors: Daiki Iwata, Shizuoka (JP); Takeshi Kajikawa, Shizuoka (JP); Hideo Aihara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/772,274

(22) PCT Filed: Mar. 6, 2014

(86) PCT No.: PCT/JP2014/056591
§ 371 (c)(1),
(2) Date: Sep. 2, 2015

(87) PCT Pub. No.: WO2014/136988
PCT Pub. Date: Sep. 12, 2014

(65) Prior Publication Data
US 2016/0001583 A1    Jan. 7, 2016

(30) Foreign Application Priority Data

Mar. 7, 2013  (JP) ................................ 2013-044883

(51) Int. Cl.
*B41M 5/42*        (2006.01)
*B41M 5/44*        (2006.01)
(Continued)

(52) U.S. Cl.
CPC .................. *B41M 5/44* (2013.01); *B32B 7/12* (2013.01); *B32B 27/14* (2013.01); *B32B 27/205* (2013.01);
(Continued)

(58) Field of Classification Search
CPC ...... B41M 5/42; B41M 5/44; B41M 2205/04; B41M 2205/38; B41M 2205/40
(Continued)

(56) References Cited

U.S. PATENT DOCUMENTS 5,238,900 A * 8/1993 Shuku .................... B41M 5/405
                                                         427/152
7,985,711 B2    7/2011 Tohmatsu et al.
(Continued)

FOREIGN PATENT DOCUMENTS

JP        05-032047        2/1993
JP        06-155916        6/1994
(Continued)

OTHER PUBLICATIONS

International Search Report Issued May 13, 2014 for counterpart International Patent Application No. PCT/JP2014/056591 filed Mar. 6, 2014.
(Continued)

*Primary Examiner* — Bruce H Hess
(74) *Attorney, Agent, or Firm* — Cooper & Dunham LLP

(57) ABSTRACT

To provide a thermosensitive recording material, containing: a support; an under layer; a thermosensitive recording layer; and a protective layer, where the under layer, the thermosensitive recording layer, and the protective layer are provided in this order on at least one surface of the support, wherein the support is synthetic paper, or a synthetic resin film, wherein the under layer contains a binder resin, and hollow particles, wherein an adhesive force of the thermosensitive recording material at −20° C., as measured by the described measuring method of the adhesive force, is 10.0 N/25 mm or greater.

10 Claims, 1 Drawing Sheet

(51) Int. Cl.
| | |
|---|---|
| *B41M 5/41* | (2006.01) |
| *B32B 7/12* | (2006.01) |
| *B32B 27/14* | (2006.01) |
| *B32B 27/20* | (2006.01) |
| *B32B 27/30* | (2006.01) |
| *B32B 27/34* | (2006.01) |
| *B32B 29/04* | (2006.01) |
| *B41M 5/337* | (2006.01) |
| *C09D 7/40* | (2018.01) |
| *C08K 7/22* | (2006.01) |

(52) U.S. Cl.
CPC ............ *B32B 27/306* (2013.01); *B32B 27/34* (2013.01); *B32B 29/04* (2013.01); *B41M 5/3372* (2013.01); *B41M 5/41* (2013.01); *B41M 5/42* (2013.01); *C09D 7/70* (2018.01); *B32B 2260/025* (2013.01); *B32B 2260/046* (2013.01); *B32B 2307/208* (2013.01); *B32B 2307/40* (2013.01); *B41M 2205/04* (2013.01); *B41M 2205/38* (2013.01); *B41M 2205/40* (2013.01); *C08K 7/22* (2013.01)

(58) Field of Classification Search
USPC ........................................................ 503/226
See application file for complete search history.

(56) References Cited

U.S. PATENT DOCUMENTS

| | | | |
|---|---|---|---|
| 8,143,191 B2 | 3/2012 | Aihara | |
| 8,227,379 B2 | 7/2012 | Okada et al. | |
| 8,513,160 B2* | 8/2013 | Hada | ........................ B41M 5/42 |
| | | | 427/152 |
| 9,283,793 B2* | 3/2016 | Ikeda | ........................ G09F 3/10 |
| 2003/0228439 A1* | 12/2003 | Kawakami | ............... B41M 5/34 |
| | | | 428/65.2 |
| 2008/0234128 A1 | 9/2008 | Orihara et al. | |
| 2009/0075817 A1 | 3/2009 | Aihara et al. | |
| 2009/0176647 A1 | 7/2009 | Hada et al. | |
| 2010/0062936 A1 | 3/2010 | Orihara et al. | |
| 2014/0148334 A1 | 5/2014 | Shimizu et al. | |

FOREIGN PATENT DOCUMENTS

| | | |
|---|---|---|
| JP | 06-344662 | 12/1994 |
| JP | 09-011625 | 1/1997 |
| JP | 10-035103 | 2/1998 |
| JP | 11-052862 | 2/1999 |
| JP | 2002-316482 | 10/2002 |
| JP | 2006-289962 | 10/2006 |
| JP | 2008-062527 | 3/2008 |
| JP | 2008-062537 | 3/2008 |
| JP | 2008-094092 | 4/2008 |
| JP | 2008-194843 | 8/2008 |
| JP | 2008-254436 | 10/2008 |
| JP | 2008-260275 | 10/2008 |
| JP | 2008-290341 | 12/2008 |
| JP | 2009-23237 | 2/2009 |
| JP | 2009-262380 | 11/2009 |
| JP | 2010-52375 | 3/2010 |
| JP | 2010-52376 | 3/2010 |
| JP | 2010-094981 | 4/2010 |
| JP | 2010-115836 | 5/2010 |
| JP | 2013-049265 | 3/2013 |
| NZ | 620282 | 12/2015 |

OTHER PUBLICATIONS

Jan. 28, 2016 European Search Report in corresponding European Patent Application No. EP 14760149.6.

Korean official action (and English translation thereof) dated May 30, 2017 in connection with a counterpart Korean patent application No. 10-2015-7025409.

Korean official action (and English translation thereof) dated May 30, 2017 in connection with a counterpart Korean patent application No. 10-2015-7025409.

New Zealand official action dated Jan. 19, 2016 in connection with corresponding New Zealand patent aplication No. 711733.

Oct. 24, 2017 Japanese official action (and a machine translation thereof obtained from Global Dossier) in connection with counterpart Japanese patent application No. 2014-040334.

* cited by examiner

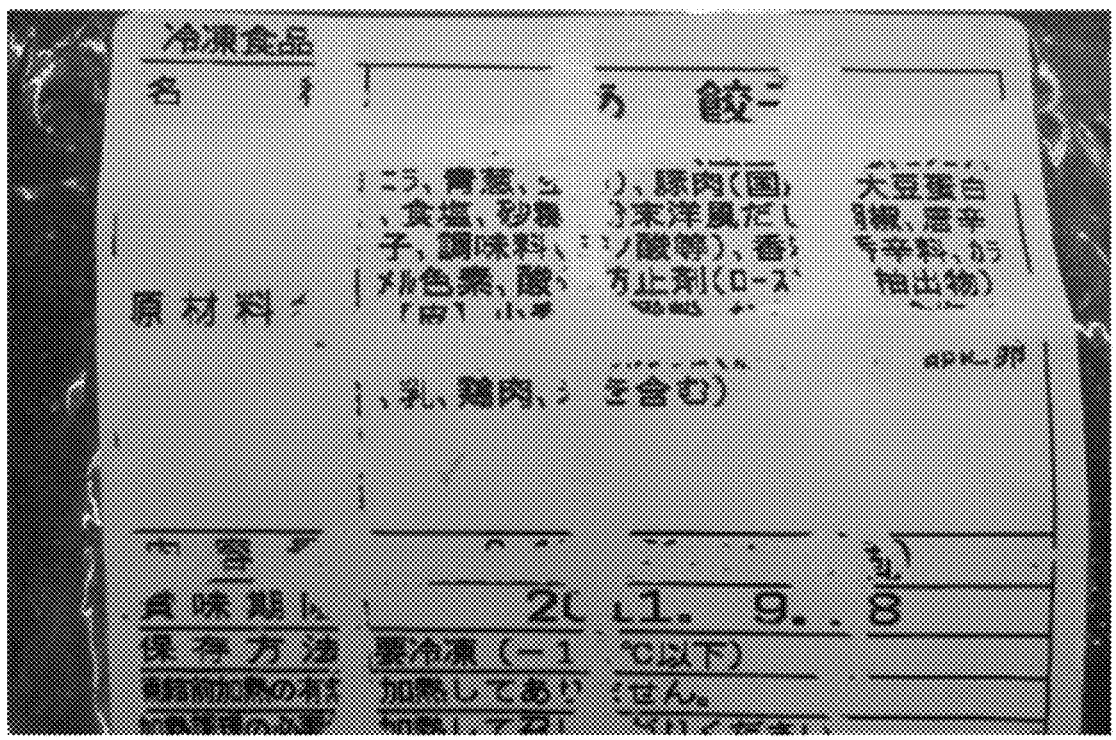

THERMOSENSITIVE RECORDING MATERIAL

TECHNICAL FIELD

The present invention relates to a thermosensitive recording material.

BACKGROUND ART

A thermosensitive recording material is a recording material having a structure where an under layer, a thermosensitive recording layer, which colors upon application of heat, and a protective layer are formed on a support. As for application of heat to color the thermosensitive recording material, a thermal printer equipped with a thermal head therein is used.

A thermosensitive recording method using the thermosensitive recording material is advantageous over other recording methods, because it is not necessary to perform developing or fixing, recording can be performed within a short period of time using a relatively simple device, and a cost thereof is low. Therefore, the thermosensitive recording method using the thermosensitive recording material has been used in various fields, such as POS (e.g., for fresh food, lunch boxy, ready made food), copying (e.g., for books, and documents), telecommunication (e.g., facsimile), ticketing (e.g., a ticketing machine, a bill, and a receipt), and a tag for packaging for air crafts.

As for a support of the thermosensitive recording material, synthetic paper or a synthetic resin film has been used, as they have excellent size stability and physical strength, and are insoluble to water (see PTL 1 and PTL 2).

However, a coating liquid cannot be penetrated into a film base, such as the synthetic paper, and the synthetic resin film, compared to the degree of the penetration thereof to paper base. Therefore, adhesion between the support and the under layer, adhesion between the under layer and the thermosensitive recording layer, and adhesion between the thermosensitive recording layer and the protective layer become weak. Especially, the adhesion between the support and the under layer tends to weaken.

In the case where a thermosensitive recording material is stored in a freezing environment in a state where a surface of the thermosensitive recording material is in contact with a plastic container with the thermosensitive recording material being peeled due to the aforementioned reduction in adhesion, or separated due to elusion of water-soluble components especially as being wet with water, or wet with water or condensation water, the surface of thermosensitive recording material is strongly adhered to the plastic container via ice. If the plastic container is released from the thermosensitive recording material with force, there is a problem that the surface of the thermosensitive recording material is peeled. As a result, as illustrated in FIG. 1, the thermosensitive recording layer of the thermosensitive recording material is peeled, and therefore it may become difficult to visually confirm the recorded information, or a problem, such as a reading failure with a barcode reader, may occur.

Note that, in the present invention, the freezing environment means an environment of −20° C.

Accordingly, there is a need for a thermosensitive recording material having high coloring sensitivity and high image density without causing peeling of a thermosensitive recording layer even upon application of mechanical external force in a freezing environment.

CITATION LIST

Patent Literature

PTL1: Japanese Patent Application Laid-Open (JP-A) No. 2008-62537
PTL2: JP-A No. 2008-62527

SUMMARY OF INVENTION

Technical Problem

The present invention aims to provide a thermosensitive recording material, which maintains high coloring sensitivity and image density, and does not cause peeling of a thermosensitive recording layer or the like even when mechanical external force is applied in a freezing environment.

Solution to Problem

The means for solving the aforementioned problem is as follows:
The thermosensitive recording material of the present invention, contains:
  a support;
  an under layer;
  a thermosensitive recording layer; and
  a protective layer,
  where the under layer, the thermosensitive recording layer, and the protective layer are provided in this order on at least one surface of the support,
  wherein the support is synthetic paper, or a synthetic resin film,
  wherein the under layer contains a binder resin, and hollow particles,
  wherein an adhesive force of the thermosensitive recording material at −20° C. is 10.0 N/25 mm or greater, where the adhesive force is measured by cutting out the thermosensitive recording material into a sample having a width of 25 mm and a length of 30 cm, bonding one end of an outermost surface of the sample at the side of the thermosensitive recording layer above the support to a substrate by 8 cm in an environment of 22° C. and 50% RH, leaving the sample to stand in an environment of −20° C. to adjust temperature of the sample to −20° C., pulling the other end of the sample in a 180 degrees direction with respect to the substrate, measuring a force (N/25 mm) at which the sample is peeled from the substrate by means of a digital force gauge, and determining a maximum value of the measured force at −20° C. as the adhesive force.

Advantageous Effects of Invention

The present invention can solve the aforementioned various problems in the art, achieve the aforementioned object, and provide a thermosensitive recording material, which maintains high coloring sensitivity and image density, and does not cause peeling of a thermosensitive recording layer or the like even when mechanical external force is applied in a freezing environment.

BRIEF DESCRIPTION OF DRAWING

The FIGURE illustrates a state where a surface of a thermosensitive recording material is peeled, when the thermosensitive recording material is stored in the freezing environment in the state where a surface of the thermosensitive recording material and a plastic container are in contact with each other, followed by removing the plastic container.

DESCRIPTION OF EMBODIMENTS (Thermosensitive Recording Material)

The thermosensitive recording material of the present invention contains a support, and on at least one surface of the support, an under layer, a thermosensitive recording layer, and a protective layer in this order. The thermosensitive recording material may further contain other layers according to the necessity.

In the present invention, an adhesive force of the thermosensitive recording material at −20° C., as measured by the following measuring method of the adhesive force, is 10.0 N/25 mm or greater, preferably 12.5 N/25 mm or greater. When the adhesive force thereof at −20° C. is less than 10.0 N/25 mm, blocking occurs in a freezing environment, and therefore recorded information may not be readable.

<Measuring Method of Adhesive Force>

In the environment of 22° C., 50% RH, the thermosensitive recording materials is cut out into a piece having a width of about 25 mm, and length of about 30 cm to prepare a sample, and one end (adhesion part) (about 8 cm) of the outermost surface of the sample, which was a side of the thermosensitive recording layer on the support, is bonded to a substrate (a stainless steel plate) with a double-sided tape (#8103D, product of DIC Corporation). The sample is then left to stand in the environment of −20° C. to adjust the temperature of the sample to −20° C. Thereafter, the other end of the sample is pulled in a 180-degree direction with respect to the substrate, and a force (N/25 mm) required for releasing the sample from the substrate is measured by means of a digital force gauge (device name: ZP-50N, product of IMADA CO., LTD.), and the maximum value thereof at −20° C. is determined as an adhesive force.

In the measuring method of the adhesive force, peeling occurs at the layers between which the adhesion is the lowest in the thermosensitive recording material. In the present invention, typically, peeling occurs between the support and the under layer where the adhesion is the lowest, but the position where the peeling occurs is not particularly limited as long as the peeling occurs.

A method for adjusting the adhesive force of the thermosensitive recording material to 10.0 N/25 mm or greater at −20° C. is appropriately selected depending on the intended purpose without any limitation, and examples thereof include a method, in which polyvinyl alcohol or an acrylic resin is used as a resin of the under layer, and a crosslinking agent, such as oxazoline, and carbodimide, is optionally used in combination.

<Support>

A shape, structure, size, and material of the support are appropriately selected depending on the intended purpose without any limitation. Examples of the shape thereof include a plate shape, and a sheet shape. The structure thereof may be a single-layer structure, or a multi-layer structure. The size thereof is appropriately selected depending on a size of the thermosensitive recording material.

As for the material of the support, either synthetic paper or a synthetic resin film is used, as these materials have desirable size stability, and physical strength, and are insoluble to water.

The synthetic paper is appropriately selected depending on the intended purpose without any limitation, and examples thereof include: synthetic paper formed of synthetic fibers, such as polyethylene, polypropylene, polyethylene terephthalate, and polyamide; and a product obtained by binding the aforementioned synthetic paper to part of, a surface of, or both surfaces of paper.

The synthetic paper may be appropriately produced for use, or may be selected from commercial products. Examples of the commercial product thereof include polypropylene films (e.g., PL-100, product of NanYa Plastics, and FPH-95, YUPO CORPORATION).

Examples of the synthetic resin film include a polypropylene film, and a polyethylene film, during film formation or drawing of which microvoids are generated therein. Among them, a polypropylene film is particularly preferable, because of its strength, and processability.

The synthetic resin film may be appropriately produced for use, or selected from commercial products. Examples of the commercial product thereof include a polyethylene terephthalate film (LUMIRROR#100 U34, product of TORAY INDUSTRIES, INC.).

The average thickness of the support is appropriately selected depending on the intended purpose without any limitation, but the average thickness thereof is preferably 20 μm to 250 μm, more preferably 50 μm to 200 μm.

<Under Layer>

The under layer contains hollow particles, and a binder resin, preferably further contains a crosslinking agent, and may further contain other components according to the necessity. Note that, the under layer may be also called as an intermediate layer.

—Hollow Particles—

The hollow particles are appropriately selected depending on the intended purpose without any limitation, but a void ratio thereof is preferably 50% or greater, more preferably 80% or greater. When the void ratio is less than 50%, coloring sensitivity and coloring precision of a resulting thermosensitive recording medium may be insufficient.

The void ratio is a ratio between outer diameters and inner diameters of the hollow particles, and is represented by the following equation.

$$\text{Void ratio (\%)} = \frac{\text{Inner diameter of hollow particle}}{\text{Outer diameter of hollow particle}} \times 100$$

The hollow particles are nonfoamable hollow particles, each of which is composed of a shell of a thermoplastic resin, and air or another gas contained therein, and is already in the foamed state. The volume average particle diameter of the hollow particles is preferably 0.4 μm to 10 μm. When the volume average particle diameter (particle outer diameter) is smaller than 0.4 μm, there is a problem in production, such as that it is difficult to attain the predetermined void ratio. When the volume average particle diameter is greater than 10 μm, smoothness of the surface after coating and drying reduces, and therefore adhesion with a thermal head reduces, and moreover an effect of improving sensitivity reduces. Accordingly, the hollow particles preferably have the volume average particle diameter of the aforementioned range, and preferably have a uniform distribution peak without less variation.

Examples of the thermoplastic resin forming shells of the hollow particles include a polystyrene resin, a polyvinyl chloride resin, a polyvinylidene chloride resin, a polyvinyl acetate resin, a polyacrylic acid ester resin, a polyacrylonitrile resin, polybutadiene, and a copolymer thereof. Among them, a copolymer mainly composed of vinylidene chloride and acrylonitrile is particularly preferable.

The hollow particles may be appropriately produced for use, or selected from commercial products. Examples of the commercial product thereof include hollow particles (ROPAQUE SN-1055, product of Dow Chemical Company, void ratio: 50%), hollow particles (ROPAQUE OP-62, product of Dow Chemical Company, void ratio: 33%), hollow particles (Matsumoto Microsphere R-500, product of Matsumoto Yushi-Seiyaku Co., Ltd., void ratio: 90%), and hollow particles (SX8782(D), JSR Corporation, void ratio: 50%).

An amount of the hollow particles in the under layer is appropriately selected depending on the intended purpose without any limitation, but the amount thereof is preferably 20% by mass to 50% by mass, more preferably 30% by mass to 40% by mass.

—Binder Resin—

The binder resin is appropriately selected depending on the intended purpose without any limitation, but the binder resin is preferably a water-soluble polymer, or an aqueous polymer emulsion.

The water-soluble polymer is appropriately selected depending on the intended purpose without any limitation, and examples thereof include: polyvinyl alcohol; modified polyvinyl alcohol, such as polyvinyl alcohol containing a carboxyl group; starch or a derivative thereof; a cellulose derivative, such as methoxy cellulose, hydroxyethyl cellulose, carboxymethyl cellulose, methyl cellulose, and ethyl cellulose; polyurethane; sodium polyacrylate; polyvinyl pyrrolidone; an acryl amide-acrylic acid ester copolymer; an acryl amide-acrylic acid ester-methacrylic acid terpolymer; an alkali salt of a styrene-maleic anhydride copolymer; an alkali salt of an isobutylene-maleic anhydride copolymer; polyacryl amide; sodium alginate; gelatin; and casein. These may be used alone, or in combination. Among them, polyvinyl alcohol containing a carboxyl group is particularly preferable.

The polyvinyl alcohol containing a carboxyl group may be appropriately synthesized for use, or selected from commercial products. Examples of the commercial product thereof include polyvinyl alcohol containing a carboxyl group (KL-318, product of KURARAY CO., LTD.), and (AP-17, product of JAPAN VAM & POVAL CO., LTD.).

The aqueous polymer emulsion is appropriately selected depending on the intended purpose without any limitation, and examples thereof include: latex, such as an acrylic resin, a modified acrylic resin (e.g., an acrylic resin containing a carboxyl group), a styrene-butadiene copolymer, and a styrene-butadiene-acryl-based copolymer; and emulsion, such as a vinyl acetate resin, a vinyl acetate-acrylic acid copolymer, a styrene-acrylic acid ester copolymer, an acrylic acid ester resin, and a polyurethane resin. These may be used alone, or in combination. Among them, an acrylic resin containing a carboxyl group is preferable, and an acrylic resin emulsion containing a carboxyl group is particularly preferable.

The acrylic resin emulsion containing a carboxyl group may be appropriately synthesized for use, or selected from commercial products. Examples of the commercial product thereof include Saivinol EK-301 (product of SAIDEN CHEMICAL INDUSTRY CO., LTD.), and JONCRYLPDX-7370 (BASF Japan Ltd.).

In the present invention, use of the polyvinyl alcohol containing a carboxyl group and the acrylic resin containing a carboxyl group in combination is preferable in view of adhesion between the support and the under layer.

A mass ratio (A:B) of the polyvinyl alcohol containing a carboxyl group A to the acrylic resin containing a carboxyl group B is appropriately selected depending on the intended purpose without any limitation, but it is preferably 2:1 to 1:5, more preferably 1:1 to 1:3. When the mass ratio is within the preferable range, coating layer of a resulting thermosensitive recording material, such as a thermosensitive recording layer, are not peeled even upon application of mechanical external force in a freezing environment, and high coloring sensitivity and high image density can be achieved.

An amount of the binder resin in the under layer is appropriately selected depending on the intended purpose without any limitation, but the amount thereof is preferably 30 parts by mass to 300 parts by mass, more preferably 40 parts by mass to 200 parts by mass, relative to 100 parts by mass of the hollow particles.

When the amount thereof is smaller than 30 parts by mass, the binding force between the support and the under layer may be insufficient. When the amount thereof is grater than 300 parts by mass, coloring performance of a resulting thermosensitive recording material may be low.

—Crosslinking Agent—

The crosslinking agent is appropriately selected depending on the intended purpose without any limitation, and examples thereof include an oxazoline group-containing compound, a glyoxal derivative, a methylol derivative, an epichlorohydrin derivative, an epoxy compound, an aziridine compound, hydrazine, a hydrazide derivative, and a carbodimide derivative. These may be used alone, or in combination. Among them, an oxazoline group-containing compound is particularly preferable, as it gives a high binding force with the support and water resistance, and use thereof in the under layer gives a short curing time required for providing water resistance.

The oxazoline group-containing compound may be appropriately synthesized for use or selected from commercial products. Examples of the commercial product thereof include EPOCROS WS-700 (product of NIPPON SHOKUBAI CO., LTD.).

An amount of the oxazoline group-containing compound is appropriately selected depending on the intended purpose without any limitation, but the amount thereof is preferably 20 parts by mass to 70 parts by mass, more preferably 30 parts by mass to 50 parts by mass, relative to 100 parts by mass of the binder resin. When the amount thereof is smaller than 20 parts by mass, a curing time required for providing water resistance to the under layer may become long. When the amount thereof is greater than 70 parts by mass, a coloring ability of a resulting thermosensitive recording material may be low, and it is also not preferable in view of cost efficiency.

—Other Components—

Other components are appropriately selected depending on the intended purpose without any limitation, and examples thereof include a surfactant, fillers, a lubricant, and a loading material.

A formation method of the under layer is appropriately selected depending on the intended purpose without any limitation. For example, the under layer can be formed by dispersing the binder resin, the hollow particles, water, preferably the crosslinking agent, and optionally other component together by means of a disperser to prepare an under layer coating liquid, applying the under layer coating liquid onto the support, and drying.

The coating method is appropriately selected depending on the intended purpose without any limitation, and examples thereof include blade coating, gravure coating, gravure offset coating, bar coating, roller coating, knife coating, air knife coating, Comma coating, U Comma coating, AKKU coating, smoothing coating, micro gravure coating, reverse roller coating, 4- or 5-roll coating, dip coating, curtain coating, slide coating, and die coating.

A deposition amount of the under layer on dry basis is appropriately selected depending on the intended purpose without any limitation, but it is preferably 1 g/m² to 5 g/m², more preferably 2 g/m² to 5 g/m².

<Thermosensitive Recording Layer>

The thermosensitive recording layer contains a leuco dye, a color developer, and a binder resin, and may further contain other components according to the necessity.

—Leuco Dye—

The leuco dye is appropriately selected from those typically used for a thermosensitive recording material depending on the intended purpose without any limitation. Suitable examples thereof include dye leuco compounds, such as a triphenyl methane-based compound, a fluoran-based compound, a phenothiazine-based compound, an auramine-based compound, a spiropyran-based compound, and an indolinophthalide-based compound.

The leuco dye is appropriately selected depending on the intended purpose without any limitation. Examples thereof include 3,3-bis(p-dimethylaminophenyl)-phthalide, 3,3-bis(p-dimethylaminophenyl)-6-dimethylaminophthalide (i.e. crystal violet lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzofluoran, 3-diethylamino-6-methyl-7-chlorofluoran, 3-(N-p-tolyl-N-ethylamino)-6-methyl-7-anilinofluoran, 2-{N-(3'-trifluoromethylphenyl)amino}-6-diethylaminofluoran, 2-{3,6-bis(diethylamino)-9-(o-chloroanilino)xantylic benzoic acid lactam}, 3-diethylamino-6-methyl-7-(m-trichloromethylanilino)fluoran, 3-diethylamino-7-(o-chloroanilino)fluoran, 3-pyrrolidino-6-methyl-7-anilinofluoran, 3-di-n-butylamino-7-o-chloroanilino)fluoran, 3-N-methyl-N,n-amylamino-6-methyl-7-anilinofluoran, 3-N-methyl-N-cyclohexylamino-6-methyl-7-anilinofluoran, 3-diethylamino-6-methyl-7-anilinofluoran, 3-(N,N-diethylamino)-5-methyl-7-(N,N-dibenzylamino)fluoran, benzoyl leuco methylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'chlorophenyl)phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl)phthalide, 3-(2'-methoxy-4'-dimethylaminophenyl)-3-(2'-hydroxy-4'-chloro-5'-methylphenyl)phthalide, 3-(N-ethyl-N-tetrafurfuryl)amino-6-methyl-7-anilinofluoran, 3-N-ethyl-N-(2-ethoxypropyl)amino-6-methyl-7-anilinofluoran, 3-N-methyl-N-isobutyl-6-methyl-7-anilinofluoran, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-di-n-butylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-a-naphthylamino-4'-bromofluoran, 3-diethylamino-6-chloro-7-anilinofluoran, 3-diethylamino-6-methyl-7-mesidino-4',5'-benzofluoran, 3-N-methyl-N-isopropyl-6-methyl-7-anilinofluoran, 3-N-ethyl-N-isoamyl-6-methyl-7-anilinofluoran, 3-diethylamino-6-methyl-7-(2',4'-dimethylanilino)fluoran, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-N-butylanilino)fluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-N-ethyl-N-(-2-ethoxypropyl)amino-6-methyl-7-anilinofluoran, 3-N-ethyl-N-tetrahydrofurfurylamino-6-methyl-7-anilinofluoran, 3-diethylamino-6-methyl-7-mesidino-4',5'-benzofluoran, 3-p-dimethylaminophenyl)-3-{1,1-bis(p-dimethylaminophenyl)ethylen-2-yl}phthalide, 3-(p-dimethylaminophenyl)-3-{1,1-bis(p-dimethylaminophenyl)ethylen-2-yl}-6-dimethylaminophthalide, 3-(p-dimethylaminophenyl)-3-(1-p-dimethylaminophenyl-1-phenylethylen-2-yl)phthalide, 3-(p-dimethylaminophenyl)-3-(1-p-dimethylaminophenyl-1-p-chlorophenylethylen-2-yl)-6-dimethylaminophthalide, 3-(4'-dimethylamino-2'-methoxy)-3-(1"-p-dimethylaminophenyl-1"-p-chlorophenyl-1",3"-butadien-4"-yl)benzophthalide, 3-(4'-dimethylamino-2'-benzyloxy)-3-(1"-p-dimethylaminophenyl-1"-phenyl-1",3"-butadien-4"-yl)benzophthalide, 3-dimethylamino-6-dimethylaminofluorene-9-spiro-3'-(6'-dimeth ylamino)phthalide, 3,3-bis(2-(p-dimethylaminophenyl)-2-p-methoxyphenyl)ethenyl)-4,5,6,7-tetrachlorophthalide, 3-bis{1,1-bis(4-pyrrolidinophenyl)ethylen-2-yl}-5,6-dichloro-4,7-dibromophthalide, bis(p-dimethylaminostyryl)-1-naphthalene sulfonylmethane, and bis(p-dimethylaminostyryl)-1-p-tolylsulfonylmethane. These may be used alone, or in combination.

—Color Developer—

Examples of the color developer include various electron-accepting compounds and oxidants capable of coloring the leuco dye. Such color developer is appropriately selected depending on the intended purpose without any limitation. Examples thereof include 4,4'-isoproplidene bisphenol, 4,4'-isoproplidene bis(o-methylphenol), 4,4'-secondarybutylidene bisphenol, 4,4'-isoproplidene bis(2-tert-butylphenol), zinc p-nitrobenzonate, 1,3,5-tris(4-tert-butyl-3-hydroxy-2,6-dimethylbenzyl)isocyanurate, 2,2-(3,4'-dihydroxydiphenyl)propane, bis(4-hydroxy-3-methylphenyl)sulfide, 4-{β-(p-methoxyphenoxy)ethoxy}salicylate, 1,7-bis(4-hydroxyphenylthio)-3,5-dioxaheptane, 1,5-bis(4-hydroxyphenylthio)-5-oxapentane, monocalcium monobenzyl phthalate, 4,4'-cyclohexylidene diphenol, 4,4'-isoproplidene bis(2-chlorophenol), 2,2'-methylene bis(4-methyl-6-tert-butylphenol), 4,4'-butylidene bis(6-tert-butyl-2-methyl)phenol, 1,1,3-tris(2-methyl-4-hydroxy-5-tert-butylphenyl)butane, 1,1,3-tris(2-methyl-4-hydroxy-5- cyclohexylphenyl)butane, 4,4'-thiobis(6-tert-butyl-2-methyl)phenol, 4,4'-diphenolsulfone, 4-isopropoxy-4'-hydroxydiphenylsulfone, 4-benzyloxy-4'-hydroxydiphenylsulfone, 4,4'-diphenolsulfoxide, isopropyl p-hydroxy benzoate, benzyl p-hydroxy benzoate, benzyl protocatechuic acid, stearyl gallate, lauryl gallate, octyl gallate, 1,3-bis(4-hydroxyphenylthio)-propane, N,N'-diphenyl thiourea, N,N'-di(m-chlorophenyl)thiourea, salicylanilide, methyl bis-(4-hydroxyphenyl)acetate, benzyl bis-(4-hydroxyphenyl)acetate, 1,3-bis(4-hydroxycumyl) benzene, 1,4-bis(4-hydroxycumyl)benzene, 2,4'-diphenolsulfone, 2,2'-diallyl-4,4'-diphenolsulfone, 3,4-dihydroxyphenyl-4'-methyldiphenylsulfone, zinc 1-acetyloxy-2-naphthoate, zinc 2-acetyloxy-1-naphthoate, zinc 2-acetyloxy-3-naphthoate, α,α-bis(4-hydroxyphenyl)-α-methyltoluene, an antipyrine complex of zinc thiocyanate, tetrabromobisphenol A, tetrabromobisphenol S, 4,4'-thiobis(2-methylphenol), and 4,4'-thiobis(2-chlorophenol). These may be used alone, or in combination.

An amount of the color developer is appropriately selected depending on the intended purpose without any limitation, but the amount thereof is preferably 1 part by mass to 20 parts by mass, more preferably 2 parts by mass to 10 parts by mass, relative to 1 part by mass of the leuco dye.

—Binder Resin—

The binder resin is appropriately selected depending on the intended purpose without any limitation, and examples thereof include: a polyvinyl alcohol resin; starch or a derivative thereof; a cellulose derivatives, such as hydroxymethyl cellulose, hydroxyethyl cellulose, carboxymethyl cellulose, methyl cellulose, and ethyl cellulose; a water-soluble polymer, such as sodium polyacrylate, polyvinyl pyrrolidone, an acrylamide-acrylic acid ester copolymer, an acryl amide-acrylic acid ester-methacrylic acid terpolymer, an alkali salt of a styrene-maleic anhydride copolymer, an alkali salt of an isobutylene-maleic anhydride copolymer, polyacrylamide, sodium alginate, gelatin, and casein; an emulsion, such as polyvinyl acetate, polyurethane, polyacrylic acid, polyacrylic acid ester, a vinyl chloride-vinyl acetate copolymer, polybutyl methacrylate, an ethylene-vinyl acetate copolymer; and latex, such as a styrene-butadiene copolymer, and styrene-butadiene-acryl based copolymer. These may be used alone, or in combination.

To the thermosensitive recording layer, various thermoplastic materials can be optionally added as a sensitivity improving agent. Note that, in the case heat resistance is required, such as in use for labeling of ready cooked food, it is preferred that the thermoplastic material be not added, or a compound having a melting point of 100° C. or higher be selected.

The thermoplastic material is appropriately selected is depending on the intended purpose without any limitation. Examples thereof include: fatty acid, such as stearic acid, and behenic acid; fatty acid amide, such as stearic acid amide, and palmitic acid amide; a metal salt of fatty acid, such as zinc stearate, aluminum stearate, calcium stearate, zinc palmitate, and zinc behenate; and others, such as p-benzylbiphenyl, terphenyl, triphenylmethane, benzyl p-benzyloxy benzoate, β-benzyloxynaphthalene, phenyl β-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxy naphthalene, 1,4-diethoxy naphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio)ethane, dibenzoyl methane, 1,4-diphenyl thiobutane, 1,4-diphenyl-thio-2-butene, 1,3-bis(2-vinyloxyethoxy)benzene, 1,4-bis(2-vinyloxyethoxy)benzene, p-(2-vinyloxyethoxy)biphenyl, p-aryloxy biphenyl, p-propargyloxy biphenyl, dibenzoyloxy methane, dibenzoyloxy propane, dibenzyl disulfide, 1,1-diphenyl ethanol, 1,1-diphenyl propanol, p-benzyloxy benzyl alcohol, 1,3-phenoxy-2-propanol, N-octadecylcarbamoyl-p-methoxycarbonylbenzene, N-octadecylcarbamoylbenzene, 1,2-bis(4-methoxyphenoxy)propane, 1,5-bis(4-methoxyphenoxy)-3-oxapentane, dibenzyl oxalate, bis(4-methylbenzyl) oxalate, and bis(4-chlorobenzyl) oxalate. These may be used alone, or in combination.

Moreover, various hindered phenol compounds or hindered amine compounds, which are electron-accepting compounds but have relatively low coloring ability, may be optionally added to the thermosensitive recording layer as an auxiliary additive. Specific examples thereof include 2,2'-methylenebis(4-ethyl-6-tert-butylphenol), 4,4'-butylidene bis(6-tert-butyl-2-methylphenol), 1,1,3-tris(2-methyl-4-hydroxy-5-tert-butylphenyl)butane, 1,1,3-tris(2-methyl-4-hydroxy-5-cyclohexylphenyl)butane, 4,4'-thiobis(6-tert-butyl-2-methylphenol), tetrabromobisphenol A, tetrabromobisphenol S, 4,4-thiobis(2-methylphenol), 4,4'-thiobis(2-chlorophenol), tetrakis(1,2,2,6,6-pentamethyl-4-piperidyl)-1,2,3,4-butane tetracarboxylate, and tetrakis(1,2,2,6,6-tetramethyl-4-piperidyl)-1,2,3,4-butane tetracarboxylate.

—Other Components—

Other components are appropriately selected depending on the intended purpose without any limitation, and examples thereof include a surfactant, a lubricant, and a loading material.

Examples of the lubricant include higher fatty acid or a metal salt thereof, higher fatty acid amide, higher fatty acid ester, animal wax, vegetable wax, mineral wax, and petroleum wax.

Examples of the loading material include: inorganic powders, such as calcium carbonate, silica, zinc oxide, titanium oxide, aluminum hydroxide, zinc hydroxide, barium sulfate, clay, kaolin, talc, surface-treated calcium, and surface-treated silica; and organic powders, such as a urea-formaline resin, a styrene-methacrylic acid copolymer, a polystyrene resin, and a vinylidene chloride resin.

The thermosensitive recording layer can be formed by a conventionally known method without any limitation. For example, the thermosensitive recording layer can be formed by pulverizing and dispersing the leuco dye, the color developer, the binder resin, and other components by means of a disperser, such as a ball mill, Attritor, and a sand mill, until attaining a dispersion particle diameter of 0.1 μm to 3 μm, followed by optionally mixing with a loading material, and a thermoplastic material dispersion liquid, to thereby prepare a thermosensitive recording layer coating liquid, applying the thermosensitive recording layer coating liquid onto the under layer, and drying.

The coating method is appropriately selected depending on the intended purpose without any limitation, and examples thereof include blade coating, gravure coating, gravure offset coating, bar coating, roller coating, knife coating, air knife coating, Comma coating, U Comma coating, AKKU coating, smoothing coating, microgravure coating, reverse roller coating, 4- or 5-roll coating, dip coating, curtain coating, slide coating, and die coating.

A deposition amount of the thermosensitive recording layer on dry basis is appropriately selected depending on the intended purpose without any limitation, but it is preferably 1 g/m² to 20 g/m², more preferably 3 g/m² to 10 g/m².

—Protective Layer—

The protective layer contains a binder resin, and a crosslinking agent, and may further contain other components according to the necessity.

The binder resin is appropriately selected depending on the intended purpose without any limitation, but the binder resin is preferably a water-soluble resin.

Examples of the water-soluble resin include: polyvinyl alcohol; modified polyvinyl alcohol, such as polyvinyl alcohol containing a carboxyl group; starch or a derivative thereof; a cellulose derivative, such as methoxy cellulose, hydroxyethyl cellulose, carboxymethyl cellulose, methyl cellulose, and ethyl cellulose; sodium polyacrylate; polyvinyl pyrrolidone; an acryl amide-acrylic acid ester copolymer; an acryl amide-acrylic acid ester-methacrylic acid terpolymer; an alkali salt of a styrene-maleic anhydride copolymer; an alkali salt of an isobutylene-maleic anhydride copolymer; polyacryl amide; modified polyacryl amide; a methylvinyl ether-maleic anhydride copolymer; carboxy-modified polyethylene; a polyvinyl alcohol-acrylamide block copolymer; a melamine-formaldehyde resin; a urea-formaldehyde resin; sodium alginate; gelatin; and casein. These may be used alone, or in combination. Among them, preferred are polyvinyl alcohol, and polyvinyl alcohol containing a carboxyl group, and particularly preferred is polyvinyl alcohol containing a carboxyl group.

The crosslinking agent is appropriately selected depending on the intended purpose without any limitation, provided that it is a compound, which reacts with the water-soluble resin to reduce solubility of the water-soluble resin to water. Examples thereof include a glyoxal derivative, a methylol derivative, epichlorohydrin, polyamide epichlorohydrin, an epoxy compound, an aziridine compound, hydrazine, a hydrazide derivative, an oxazoline derivative, and a carbodiimide derivative. These may be used alone, or in combination. Among them, polyamide epichlorohydrin is particularly preferable, as it is highly safe upon handling, and has a short curing time required for providing water resistance.

An amount of the polyamide epichlorohydrin is appropriately selected depending on the intended purpose without any limitation, but the amount thereof is preferably 10 parts by mass to 60 parts by mass, more preferably 20 parts by mass to 50 parts by mass, relative to 100 parts by mass of the binder resin.

The protective layer can be formed by a conventionally known method without any limitation.

The average thickness of the protective layer is appropriately selected depending on the intended purpose without any limitation, but the average thickness thereof is preferably 0.5 µm to 5 µm, more preferably 1 µm to 3 µm.

<Other Layers>

Other layers are appropriately selected depending on the intended purpose without any limitation, and examples thereof include a back layer.

—Back Layer—

The back layer may be optionally provided on a surface of the support, on which the thermosensitive recording layer is not provided.

The back layer contains fillers, and a binder resin, and may further contain other components, such as a lubricant, and a color pigment, according to the necessity.

As for the fillers, for example, inorganic filler, or organic fillers can be used. Examples of the inorganic fillers include a carbonic acid salt, a silicic acid salt, metal oxide, and a sulfuric acid compound. Examples of the organic fillers include a silicone resin, a cellulose resin, an epoxy resin, a nylon resin, a phenol resin, a polyurethane resin, a urea resin, a melamine resin, a polyester resin, a polycarbonate resin, a styrene-based resin, an acrylic resin, a polyethylene resin, a formaldehyde resin, and a polymethyl methacrylate resin.

The binder resin is appropriately selected depending on the intended purpose without any limitation, and examples thereof include those listed as the binder resin of the thermosensitive recording layer.

The average thickness of the back layer is appropriately selected depending on the intended purpose without any limitation, but the average thickness thereof is preferably 0.1 µm to 20 µm, more preferably 0.3 µm to 10 µm.

<Thermosensitive Recording Label>

A first embodiment of a thermosensitive recording label as the thermosensitive recording material contains an adhesive layer on a surface of a support, on which a thermosensitive recording layer is not provided, and release paper on the adhesive layer, and may further contain other layers.

A material of the adhesive layer is appropriately selected depending on the intended purpose without any limitation, and examples thereof include a urea resin, a melamine resin, a phenol resin, an epoxy resin, a vinyl acetate-based resin, a vinyl acetate-acryl based copolymer, an ethylene-vinyl acetate copolymer, an acrylic resin, a polyvinyl ether-based resin, a vinyl chloride-vinyl acetate based copolymer, a polystyrene-based resin, a polyester-based resin, a polyurethane-based resin, a polyamide-based resin, a polyolefin chloride-based resin, a polyvinyl butyral-based resin, an acrylic acid ester-based copolymer, a methacrylic acid ester-based copolymer, natural rubber, a cyanoacrylate-based resin, and a silicone-based resin. These may be used alone, or in combination.

A second embodiment of the thermosensitive recording label contains a thermosensitive adhesive layer on a surface of a support, on which a thermosensitive recording layer is not provided, and may further contain other layers according to the necessity.

The thermosensitive adhesive layer contains a thermoplastic resin, and a hot-melt material, and may further contain a tackifier according to the necessity.

The thermoplastic resin is a material for providing sticking, and adhesive force. The hot-melt material does not impart plasticity to the resin, as the hot-melt material is a solid at room temperature. Upon application of heat, the hot-melt material is melted to swell or soften the resin to thereby exhibit adhesion. Moreover, the tackifier has a function for improving adhesion.

<Thermosensitive Magnetic Recording Paper>

A thermosensitive magnetic recording paper as the thermosensitive recording material contains a magnetic recording layer on a surface of a support, on which a thermosensitive recording layer is not provided, and may further contain other layers according to the necessity.

The magnetic recording layer is formed by applying iron oxide or barium ferrite, and a resin, such as a vinyl chloride-based resin, a urethane-based resin, and a nylon-based resin, on a support through coating, or is formed by a method using vapor deposition or sputtering without using a resin. The magnetic recording layer is preferably provided on an opposite surface of the support to the surface thereof where the thermosensitive recording layer is provided, but may be provided between the support and the thermosensitive recording layer, or on part of the thermosensitive recording layer.

A shape of the thermosensitive recording material of the present invention is appropriately selected depending on the intended purpose without any limitation, and examples thereof include a label shape, a sheet shape, and a roll shape.

A recording method using the thermosensitive recording material of the present invention is appropriately selected depending on the intended purpose without any limitation, and examples thereof include a method using a thermal head, and a method using a laser.

A shape, structure, and size of the thermal head are appropriately selected depending on the intended purpose without any limitation.

The laser is appropriately selected depending on the intended purpose without any limitation, but it is preferably a $CO_2$ laser that emits light having wavelength of 9.3 µm to 10.6 µm.

The thermosensitive recording material of the present invention can be used in various fields, such as POS (e.g., for fresh food, lunch boxy, ready made food), copying (e.g., for books, and documents), telecommunication (e.g., facsimile), ticketing (e.g., a ticketing machine, a bill, and a receipt), and a tag for packaging for air crafts. Among them, the thermosensitive recording material of the present invention is suitably used in POS, especially for use where it is frozen and stored in the state where it is wet with water or condensation water, and a surface of the thermosensitive recording material is in contact with a plastic container.

EXAMPLES

Examples of the present invention are explained hereinafter, but Examples shall not be construed as to limit the scope of the present invention.

Example 1

<Production of Thermosensitive Recording Material>
—Preparation of Under Layer Coating Liquid [A Liquid]—

The following materials were mixed and stirred, to thereby prepare an under layer coating liquid [A Liquid].

Hollow particles 48 parts by mass (ROPAQUE SN-1055, product of Dow Chemical Company, void ratio: 50%, solid content: 27.5% by mass)

Aqueous urethane resin 2 parts by mass (Neo Rez R-600, product of DSM Neo Resins, solid content: 33% by mass)

Styrene-butadiene based copolymer resin 13 parts by mass (Smartex PA-8076, manufactured by Nippon A & L Inc., solid content: 48% by mass)

Ion exchanged water 37 parts by mass

—Preparation of Thermosensitive Recording Layer Coating Liquid [D Liquid]—

The following materials of [B Liquid], and those of [C Liquid] were respectively dispersed by means of a sand grounder, to thereby prepare [B Liquid] having the average particle diameter of: 0.5 µm, and [C Liquid] having the average particle diameter of: 1.5 µm.

Subsequently, 14 parts by mass of [B Liquid], 61 parts by mass of [C Liquid], 9 parts by mass of polyvinyl alcohol containing a carboxyl group (KL-318, product of KURARAY CO., LTD., solid content: 17% by mass), and 17 parts by mass of water were mixed together and stirred, to thereby prepare a thermosensitive recording layer coating liquid [D Liquid].

[B Liquid]
  2-anilino-3-methyl-6-dibutylaminofluoran 40 parts by mass
  Modified polyvinyl alcohol aqueous solution 40 parts by mass (GOHSERAN L-3266, product of The Nippon Synthetic Chemical Industry Co., Ltd., solid content: 10% by mass)
  Ion exchanged water 20 parts by mass

[C Liquid]
  4-hydroxy-4'-isopropoxydiphenylsulfone 17 parts by mass
  Carboxyl group-modified vinyl alcohol aqueous solution 9 parts by mass (KL-318, product of KURARAY CO., LTD., solid content: 17% by mass)
  Silica 17 parts by mass (MIZUKASIL P-527, product of MIZUSAWA INDUSTRIAL CHEMICALS, LTD.)
  Ion exchange water 56 parts by mass —Preparation of Protective Layer Coating Liquid [F Liquid]—

A mixture composed of the following materials were pulverized for 30 minutes and dispersed by means of a sand grounder, to thereby prepare [E Liquid].

[E Liquid]
  Aluminum hydroxide 30 parts by mass
  Ion exchanged water 70 parts by mass Subsequently, [E Liquid] and the following liquids were mixed together and stirred, to thereby prepare a protective layer coating liquid [F Liquid].

[F Liquid]
  [E Liquid] 25 parts by mass
  Polyvinyl alcohol containing a carboxyl group aqueous solution 43 parts by mass (KL-318, product of KURARAY CO., LTD., solid content: 17% by mass)
  Polyamide epichlorohydrin resin 12 parts by mass (WS-525, product of SEIKO PMC CORPORATION, solid content: 25% by mass)
  Ion exchanged water 20 parts by mass Next, the under layer coating liquid [A Liquid], the thermosensitive recording layer coating liquid [D Liquid], and the protective layer coating liquid [F Liquid] were applied on a surface of a polypropylene film (PL-100, product of NanYa Plastics) having the average thickness of 100 µm, and the coating liquids were dried, to thereby form an under layer, a thermosensitive recording layer, and a protective layer, which had a deposition amount on dry basis of 3.0 $g/m^2$, 4.0 $g/m^2$, and 3.0 $g/m^2$, respectively.

Next, the resultant was subjected to a surface treatment by a super calendar to give a surface smoothness of 1,500 sec. to 2,500 sec. Thereafter, the resultant was placed in a high density polyethylene bag, and the bag was sealed, to thereby perform curing for the predetermined period in an environment of 40° C. In the manner as described above, a thermosensitive recording material of Example 1 was produced.

Examples 2 to 16 and Comparative Examples 1 to 4

Thermosensitive recording materials of Examples 2 to 16 and Comparative Examples 1 to 4 were each produced in the same manner as in Example 1, provided that a combination of a support, an under layer, and a protective layer was changed as depicted in Tables 1-1 to 1-3.

TABLE 1-1

| | | Under layer coating liquid [A Liquid] | | | | | | |
|---|---|---|---|---|---|---|---|---|
| | | Hollow particles | | | Crosslinking agent | | | Ion exchanged water |
| | Support | Product name | Void ratio | Amount (mass parts) | Type | Amount | Content (mass %) | Amount (mass parts) |
| Ex. 1 | synthetic paper (PP) | SN-1055 | 50% | 48 | — | — | — | 37 |
| Ex. 2 | synthetic paper (PP) | OP-62 | 33% | 35 | — | — | — | 50 |
| Ex. 3 | synthetic paper (PP) | SN-1055 | 50% | 36 | ADH | 10 | 20 | 29 |
| Ex. 4 | synthetic paper (PP) | SN-1055 | 50% | 36 | — | — | — | 25 |
| Ex. 5 | synthetic paper (PP) | SN-1055 | 50% | 48 | — | — | — | 27 |
| Ex. 6 | synthetic paper (PP) | SN-1055 | 50% | 48 | — | — | — | 23 |
| Ex. 7 | synthetic paper (PP) | SN-1055 | 50% | 48 | — | — | — | 21 |
| Ex. 8 | synthetic paper (PP) | SN-1055 | 50% | 48 | — | — | — | 32 |
| Ex. 9 | synthetic paper (PP) | SN-1055 | 50% | 56 | — | — | — | 26 |
| Ex. 10 | synthetic paper (PP) | SN-1055 | 50% | 29 | — | — | — | 26 |
| Ex. 11 | synthetic paper (PP) | SN-1055 | 50% | 18 | — | — | — | 26 |
| Ex. 12 | synthetic paper (PP) | R-500 | 90% | 15 | — | — | — | 28 |
| Ex. 13 | synthetic paper (PP) | SN-1055 | 50% | 45 | oxazoline WS-500 | 3 | 20 | 28 |
| Ex. 14 | Synthetic resin film (PET) | SN-1055 | 50% | 45 | oxazoline WS-500 | 3 | 20 | 28 |
| Ex. 15 | synthetic paper (PP) | SN-1055 | 50% | 42 | oxazoline WS-500 | 7 | 50 | 30 |
| Ex. 16 | synthetic paper (PP) | SN-1055 | 50% | 48 | — | — | — | 27 |
| Comp. Ex. 1 | synthetic paper (PP) | — | — | — | — | — | — | 24 |
| Comp. Ex. 2 | synthetic paper (PP) | R-500 | 90% | 15 | — | — | — | 53 |
| Comp. Ex. 3 | synthetic paper (PP) | SN-1055 | 50% | 28 | oxazoline WS-700 | 3 | 7 | 42 |
| Comp. Ex. 4 | synthetic paper (PP) | R-500 | 90% | 23 | oxazoline WS-700 | 3 | 7 | 51 |

TABLE 1-2

| | Under layer coating liquid [A Liquid] | | | | | |
|---|---|---|---|---|---|---|
| | Binder resin | | | | | Amount (mass parts) of binder resin (to 100 parts of hollow particles) |
| | Resin A | Amount of Resin A (mass parts) | Resin B | Amount of Resin B (mass parts) | Mass ratio (Resin A: Resin B) | |
| Ex. 1 | R-600 (urethane) | 2 | PA-8076 (SBR) | 13 | 1:10 | 50 |
| Ex. 2 | R-600 (urethane) | 2 | PA-8076 (SBR) | 13 | 1:10 | 50 |
| Ex. 3 | DM-17 (PVA) | 25 | — | — | — | 50 |
| Ex. 4 | KL-318 (PVA) | 39 | — | — | — | 50 |
| Ex. 5 | KL-318 (PVA) | 15 | EK-301 (acryl Em) | 10 | 2:3 | 50 |
| Ex. 6 | KL-318 (PVA) | 16 | J-63J (water-soluble acryl) | 13 | 2:3 | 50 |
| Ex. 7 | KL-318 (PVA) | 26 | EK-301 (acryl Em) | 5 | 2:1 | 50 |
| Ex. 8 | KL-318 (PVA) | 7 | EK-301 (acryl Em) | 13 | 1:5 | 50 |

TABLE 1-2-continued

Under layer coating liquid [A Liquid]

| | Binder resin | | | | | Amount (mass parts) of binder resin (to 100 parts of hollow particles) |
|---|---|---|---|---|---|---|
| | Resin A | Amount of Resin A (mass parts) | Resin B | Amount of Resin B (mass parts) | Mass ratio (Resin A: Resin B) | |
| Ex. 9 | KL-318 (PVA) | 11 | EK-301 (acryl Em) | 7 | 2:3 | 30 |
| Ex. 10 | KL-318 (PVA) | 28 | EK-301 (acryl Em) | 17 | 2:3 | 150 |
| Ex. 11 | KL-318 (PVA) | 35 | EK-301 (acryl Em) | 21 | 2:3 | 300 |
| Ex. 12 | KL-318 (PVA) | 35 | EK-301 (acryl Em) | 21 | 2:3 | 300 |
| Ex. 13 | KL-318 (PVA) | 15 | EK-301 (acryl Em) | 9 | 2:3 | 50 |
| Ex. 14 | KL-318 (PVA) | 15 | EK-301 (acryl Em) | 9 | 2:3 | 50 |
| Ex. 15 | KL-318 (PVA) | 13 | EK-301 (acryl Em) | 8 | 2:3 | 50 |
| Ex. 16 | KL-318 (PVA) | 15 | EK-301 (acryl Em) | 10 | 2:3 | 50 |
| Comp. Ex. 1 | KL-318 (PVA) | 47 | EK-301 (acryl Em) | 29 | 2:3 | 50 |
| Comp. Ex. 2 | R-600 (urethane) | 4 | PA-8076 (SBR) | 28 | 1:10 | 300 |
| Comp. Ex. 3 | — | — | JONCRYL 711 (acryl Em) | 27 | — | 150 |
| Comp. Ex. 4 | — | — | PA-6005 (SBR) | 23 | — | 150 |

TABLE 1-3

Protective layer coating liquid [F Liquid]

| | Binder resin | | Crosslinking agent | | [E Liquid] | Ion exchanged water |
|---|---|---|---|---|---|---|
| | Type | Amount (mass parts) | Type | Amount (mass parts) | Amount (mass parts) | Amount (mass parts) |
| Ex. 1 | KL-318 (PVA) | 43 | WS-525 | 12 | 25 | 20 |
| Ex. 2 | KL-318 (PVA) | 43 | WS-525 | 12 | 25 | 20 |
| Ex. 3 | KL-318 (PVA) | 43 | WS-525 | 12 | 25 | 20 |
| Ex. 4 | KL-318 (PVA) | 43 | WS-525 | 12 | 25 | 20 |
| Ex. 5 | KL-318 (PVA) | 43 | WS-525 | 12 | 25 | 20 |
| Ex. 6 | KL-318 (PVA) | 43 | WS-525 | 12 | 25 | 20 |
| Ex. 7 | KL-318 (PVA) | 43 | WS-525 | 12 | 25 | 20 |
| Ex. 8 | KL-318 (PVA) | 43 | WS-525 | 12 | 25 | 20 |
| Ex. 9 | KL-318 (PVA) | 43 | WS-525 | 12 | 25 | 20 |
| Ex. 10 | KL-318 (PVA) | 43 | WS-525 | 12 | 25 | 20 |
| Ex. 11 | KL-318 (PVA) | 43 | WS-525 | 12 | 25 | 20 |
| Ex. 12 | KL-318 (PVA) | 43 | WS-525 | 12 | 25 | 20 |
| Ex. 13 | KL-318 (PVA) | 43 | WS-525 | 12 | 25 | 20 |
| Ex. 14 | KL-318 (PVA) | 43 | WS-525 | 12 | 25 | 20 |
| Ex. 15 | KL-318 (PVA) | 43 | WS-525 | 12 | 25 | 20 |
| Ex. 16 | KL-318 (PVA) | 43 | WS-500 | 8 | 25 | 24 |
| Comp. Ex. 1 | KL-318 (PVA) | 43 | WS-525 | 12 | 25 | 20 |
| Comp. Ex. 2 | KL-318 (PVA) | 43 | WS-525 | 12 | 25 | 20 |
| Comp. Ex. 3 | KL-318 (PVA) | 43 | WS-525 | 12 | 25 | 20 |
| Comp. Ex. 4 | KL-318 (PVA) | 43 | WS-525 | 12 | 25 | 20 |

*Comparative Example 3 in Tables 1-1 to 1-3 was a reproduction of Example 9 of JP-A No. 2008-62537.
*Comparative Example 3 in Tables 1-1 to 1-3 was a reproduction of Example 14 of JP-A No. 2008-62527.

Each component used in Examples and Comparative Examples in Tables 1-1 to 1-3 is as described below.

<Support>
(1) Synthetic paper (PP): polypropylene film (PL-100, product of NanYa Plastics)
(2) Synthetic resin film (PET): polyethylene terephthalate film (LUMIRROR #100 U34, product of TORAY INDUSTRIES, INC.)

<Under Layer>
<<Hollow Particles>>
(1) Hollow particles (ROPAQUE SN-1055, product of Dow Chemical Company, void ratio: 50%, solid content: 27.5% by mass)

(2) Hollow particles (OP-62, product of Dow Chemical Company, void ratio: 33%, solid content: 37.5% by mass)
(3) Hollow particles (Matsumoto Microsphere R-500, product of Matsumoto Yushi-Seiyaku Co., Ltd., void ratio: 90%, solid content: 33% by mass)

<<Binder Resin>>
(1) Aqueous urethane resin (Neo Rez R-600, product of DSM Neo Resins, solid content: 33% by mass)
(2) Polyvinyl alcohol containing a carboxyl group (KL-318, product of KURARAY CO., LTD., solid content: 17% by mass)
(3) Acrylic resin emulsion containing a carboxyl group (Saivinol EK-301, product of SAIDEN CHEMICAL INDUSTRY CO., LTD., solid content: 42% by mass)
(4) Styrene-butadiene based copolymer resin (Smartex PA-8076, product of Nippon A & L Inc., solid content: 48% by mass)
(5) Water-soluble acrylic resin (J-63J, product of BASF Japan Ltd., solid content: 30% by mass)
(6) Acrylic resin emulsion (JONCRYL 711, product of BASF Japan Ltd., solid content: 42% by mass)
(7) Carboxyl group-containing styrene-butadiene based copolymer latex (Smartex PA-6005, product of Nippon A & L Inc., solid content: 50.3% by mass)
(8) Diacetone-modified polyvinyl alcohol (DM-17, product of JAPAN VAM & POVAL CO., LTD., solid content: 20% by mass)

<<Crosslinking Agent>>
(1) Oxazolyl group-containing compound (EPOCROS WS-500, solid content: 39% by mass, EPOCROS WS-700, solid content: 25% by mass, products of NIPPON SHOKUBAI CO., LTD.)
(2) Adipic acid dihydrazide (ADH, product of Otsuka Chemical Co., Ltd., solid content: 10% by mass)

<Protective Layer>
<<Binder Resin>>
(1) Aqueous solution of polyvinyl alcohol containing a carboxyl group (KL-318, product of KURARAY CO., LTD., solid content: 17% by mass)

<<Crosslinking Agent>>
(1) Polyamide epichlorohydrin resin (WS-525, product of SEIKO PMC CORPORATION, solid content: 25% by mass)
(2) Oxazolyl group-containing compound (EPOCROS WS-500, product of NIPPON SHOKUBAI CO., LTD., solid content: 39% by mass)

Next, various properties of the produced thermosensitive recording materials of Examples 1 to 16 and Comparative Examples 1 to 4 were evaluated in the following manners. The results are presented in Table 2.

<Adhesive Force at −20° C.>
In the environment of 22° C., 50% RH, each of the thermosensitive recording materials was cut out into a piece having a width of 25 mm, and length of 30 cm to prepare a sample, and one end (adhesion part) (8 cm) of the outermost surface of the sample, which was a side of the thermosensitive recording layer on the support, was bonded to a substrate (a stainless steel plate) with a double-sided tape (#8103D, product of DIC Corporation). The sample was then left to stand in the environment of −20° C. to adjust the temperature of the sample to −20° C. Thereafter, the other end of the sample was pulled in a 180-degree direction with respect to the substrate, and a force (N/25 mm) required for releasing the sample from the substrate was measured by means of a digital force gauge (device name: ZP-50N, product of IMADA CO., LTD.), and the maximum value thereof at −20° C. was determined as an adhesive force.

<Freeze Blocking with Ice>
A sample was prepared by cutting out each of the thermosensitive recording material into a width of 25 mm and a length of 30 cm, and in the environment of 22° C., 50% RH, one end (adhesion part)(8 cm) of the outermost surface of the sample, which was a side of the thermosensitive recording layer on the support, was adhered onto a substrate (polypropylene resin plate), onto which water droplets had been dripped. The resultant was left to stand in the environment of −20° C. to freeze the sample and to adjust the temperature of the sample to −20° C. Thereafter, the other end of the thermosensitive recording material was pulled in the 180-degree direction with respect to the substrate, and was released from the substrate. Peeling of coating layers (the under layer, the thermosensitive recording layer, and the protective layer) of the thermosensitive recording material was then observed, and evaluated based on the following criteria.

[Evaluation]
I: There was no peeling at all.
II: The peeling occurred within 10% or less of the area of the coating layers of the thermosensitive recording material bonded to the substrate.
III: The peeling occurred within 11% to 50% of the area of the coating layers of the thermosensitive recording material bonded to the substrate.
IV: The peeling occurred within 51% greater of the area of the coating layers of the thermosensitive recording material bonded to the substrate.

<Evaluation of Freeze Blocking Reproducibility (Vertical Direction)>
In the environment of 22° C., 50% RH, each of the thermosensitive recording materials in the size of about 3 cm×about 3 cm was bonded to a bottom of a sample bottle, in the state where the side of the thermosensitive recording layer is placed bottom, and the other side of the thermosensitive recording material was attached to the bottom of the sample bottle. The bottom of the sample bottle and an area of a substrate (a polypropylene resin plate) where water droplets had been dripped were attached to each other, and in this state, they were frozen in the environment of −20° C. After sufficiently adjusting the temperature of the sample bottle at −20° C., the sample bottle was slowly released from the substrate by hands in the vertical direction. Peeling of coating layers (the under layer, the thermosensitive recording layer, and the protective layer) of the thermosensitive recording material was then observed, and evaluated based on the following criteria. The evaluation result of the thermosensitive recording material of Comparative Example 2 is presented in The FIGURE.

[Evaluation Criteria of Peeling State]
I: There was no peeling at all.
II: The peeling occurred within 10% or less of the area of the coating layers of the thermosensitive recording material bonded to the substrate.
III: The peeling occurred within 11% to 50% of the area of the coating layers of the thermosensitive recording material bonded to the substrate.
IV: The peeling occurred within 51% greater of the area of the coating layers of the thermosensitive recording material bonded to the substrate.

[ANSI Grade of Barcode Reading]
A measurement was performed in accordance with ANSI X3 182, and the ANSI grade was determined. The ANSI grade indicates readability of a barcode, and the readability thereof is more excellent in the order of the grade A>B>C>D>F. C or greater is the range practically usable in the present invention.

<Water Resistant Adhesion>

Each of the thermosensitive recording materials was stored at 40° C., and 6 days layer, the following water resistant adhesion test was performed. After immersing the thermosensitive recording material in water of room temperature for 1 hour, a surface of the thermosensitive recording material at the side of the thermosensitive recording layer was strongly rubbed with a finger. How many rubbing required to cause peeling of the coating layers (the under layer, the thermosensitive recording layer, and the protective layer) was observed visually, and the results were evaluated based on the following criteria.

I: No peeling occurred even through it was rubbed 41 times or more.

II: No peeling occurred with rubbing of 10 times, but peeling occurred with rubbing of 40 times or less.

III: No peeling occurred with rubbing of 1 time, but peeling occurred with rubbing of 10 times of less.

VI: Peeling occurred with rubbing only once.

<Sensitivity Magnification>

Printing was performed on each of the thermosensitive recording materials by means of a printing simulator (product of Ohkura Electric Co., Ltd.) with head electricity of 0.45 w/dot, 1-line recording duration of 20 ms/line, a scanning line density of 8×3.85 dot/mm, and pulse width of 0.2 ms to 1.2 ms. The density of the resulting print was measured by Macbeth reflection densitometer RD-914 (product of X-Rite). The energy value required to attain 1.0 of the image density was calculated, and based on the energy value, a sensitivity magnification was calculated from the following equation using the sample of Comparative Example 1 as a standard. The larger the value of the sensitivity magnification is, more excellent coloring sensitivity (thermal response) is.

Sensitivity magnification=(the energy value of Comparative Example 1)/(the energy value of the measured sample)

<Coloring Density>

Each of the thermosensitive recording materials was colored at 120° C., 130° C., 140° C., 150° C., 160° C., 170° C., 180° C., and 190° C., by means of a heat gradient testing machine (HEAT GRADIENT, a product of TOYO SEIKI SEISAKU-SHO, LTD.). The image density of each image attained at any of the aforementioned temperature was measured by means of Macbeth reflection densitometer RD-914 (product of X-Rite), and the highest value was recorded as the coloring density.

TABLE 2

| | Adhesion at −20° C. (N/25 mm) | Freeze blocking with ice | Freeze blocking reproducibility (vertical direction) | | Sensitivity magnification | Coloring density | Water resistant adhesion [test after 40° C. storing (cure) for 6 days] |
| --- | --- | --- | --- | --- | --- | --- | --- |
| | | | Peeling rank | ANSI grade of barcode reading | | | |
| Ex. 1 | 10.5 | III | II | C | 1.13 | 1.44 | II |
| Ex. 2 | 11.8 | II | II | B | 1.08 | 1.38 | II |
| Ex. 3 | 12.1 | II | II | B | 1.07 | 1.35 | III |
| Ex. 4 | 24.0 | I | I | A | 1.09 | 1.37 | III |
| Ex. 5 | 12.5 | I | I | A | 1.13 | 1.44 | II |
| Ex. 6 | 11.5 | III | II | C | 1.17 | 1.45 | III |
| Ex. 7 | 20.0 | I | I | A | 1.10 | 1.40 | III |
| Ex. 8 | 10.2 | III | II | C | 1.13 | 1.44 | II |
| Ex. 9 | 11.0 | II | II | B | 1.17 | 1.44 | II |
| Ex. 10 | 16.5 | I | I | A | 1.12 | 1.42 | II |
| Ex. 11 | 20.0 | I | I | A | 1.08 | 1.36 | III |
| Ex. 12 | 10.8 | III | II | B | 1.18 | 1.44 | III |
| Ex. 13 | 13.0 | I | I | A | 1.14 | 1.44 | I |
| Ex. 14 | 11.5 | II | II | B | 1.10 | 1.42 | I |
| Ex. 15 | 13.0 | I | I | A | 1.13 | 1.44 | I |
| Ex. 16 | 12.0 | II | II | B | 1.12 | 1.43 | III |
| Comp. Ex. 1 | 15.5 | I | I | B | 1.00 | 1.30 | III |
| Comp. Ex. 2 | 8.0 | IV | IV | F | 1.20 | 1.44 | II |
| Comp. Ex. 3 | 9.0 | IV | IV | F | 1.15 | 1.43 | II |
| Comp. Ex. 4 | 6.5 | IV | IV | F | 1.25 | 1.43 | II |

The embodiments of the present invention are, for example, as follows:

<1> A thermosensitive recording material, containing:
a support;
an under layer;
a thermosensitive recording layer; and
a protective layer,
where the under layer, the thermosensitive recording layer, and the protective layer are provided in this order on at least one surface of the support,
wherein the support is synthetic paper, or a synthetic resin film,
wherein the under layer contains a binder resin, and hollow particles,
wherein an adhesive force of the thermosensitive recording material at −20° C. is 10.0 N/25 mm or greater, where the adhesive force is measured by cutting out the thermosensitive recording material into a sample having a width of 25 mm and a length of 30 cm, bonding one end of an outermost surface of the sample at the side of the thermosensitive recording layer above the support to a substrate by 8 cm in an environment of 22° C. and 50% RH, leaving the sample to stand in an environment of −20° C. to adjust temperature of the sample to −20° C., pulling the other end of the sample in a 180 degrees direction with respect to the substrate, measuring a force (N/25 mm) at which the sample is peeled from the substrate by means of a digital force gauge, and determining a maximum value of the measured force at −20° C. as the adhesive force.

<2> The thermosensitive recording material according to <1>, wherein the binder resin in the under layer contains a carboxyl group-containing resin.

<3> The thermosensitive recording material according to any of <1> to <2>, wherein the binder resin in the under layer contains polyvinyl alcohol containing a carboxyl group.

<4> The thermosensitive recording material according to <3>, wherein the binder resin in the under layer further contains an acrylic resin containing a carboxyl group.

<5> The thermosensitive recording material according to <4>, wherein the acrylic resin containing a carboxyl group is an acrylic resin emulsion containing a carboxyl group.

<6> The thermosensitive recording material according to any of <4> or <5>, wherein a mass ratio (A:B) of the polyvinyl alcohol containing a carboxyl group A to the acrylic resin containing a carboxyl group B is 2:1 to 1:5.

<7> The thermosensitive recording material according to any one of <1> to <6>, wherein a void ratio of the hollow particles is 50% or greater.

<8> The thermosensitive recording material according to any one of <1> to <7>, wherein an amount of the binder resin in the under layer is 30 parts by mass to 300 parts by mass, relative to 100 parts by mass of the hollow particles.

<9> The thermosensitive recording material according to any one of <1> to <8>, wherein the under layer further contains a crosslinking agent that is an oxazoline group-containing compound.

<10> The thermosensitive recording material according to <9>, wherein an amount of the oxazoline group-containing compound is 20 parts by mass to 70 parts by mass, relative to 100 parts by mass of the binder resin.

<11> The thermosensitive recording material according to any one of <1> to <10>, wherein the protective layer contains a binder resin and a crosslinking agent, where the binder resin is polyvinyl alcohol containing a carboxyl group, and the crosslinking agent is polyamide epichlorohydrin.

The invention claimed is:

1. A thermosensitive recording material, comprising:
a support;
an under layer;
a thermosensitive recording layer; and
a protective layer,
where the under layer, the thermosensitive recording layer, and the protective layer are provided in this order on at least one surface of the support,
wherein the support is synthetic paper, or a synthetic resin film,
wherein the under layer contains a binder resin, and hollow particles,
wherein an adhesive force of the thermosensitive recording material at −20° C. is 10.0 N/25 mm or greater, where the adhesive force is measured by cutting out the thermosensitive recording material into a sample having a width of 25 mm and a length of 30 cm, bonding one end of an outermost surface of the sample at the side of the thermosensitive recording layer above the support to a substrate by 8 cm in an environment of 22° C. and 50% RH, leaving the sample to stand in an environment of −20° C. to adjust temperature of the sample to −20° C., pulling the other end of the sample in a 180 degrees direction with respect to the substrate, measuring a force (N/25 mm) at which the sample is peeled from the substrate by means of a digital force gauge, and determining a maximum value of the measured force at −20° C. as the adhesive force,
wherein the binder resin in the under layer contains (i) an acrylic resin containing a carboxyl group and (ii) polyvinyl alcohol containing a carboxyl group.

2. The thermosensitive recording material according to claim 1, wherein the acrylic resin containing a carboxyl group is an acrylic resin emulsion containing a carboxyl group.

3. The thermosensitive recording material according to claim 1, wherein a mass ratio (A:B) of the polyvinyl alcohol containing a carboxyl group A to the acrylic resin containing a carboxyl group B is 2:1 to 1:5.

4. The thermosensitive recording material according to claim 1, wherein a void ratio of the hollow particles is 50% or greater.

5. The thermosensitive recording material according to claim 1, wherein an amount of the binder resin in the under layer is 30 parts by mass to 300 parts by mass, relative to 100 parts by mass of the hollow particles.

6. The thermosensitive recording material according to claim 1, wherein the under layer further contains a crosslinking agent that is an oxazoline group-containing compound.

7. The thermosensitive recording material according to claim 4, wherein an amount of the oxazoline group-containing compound is 20 parts by mass to 70 parts by mass, relative to 100 parts by mass of the binder resin.

8. The thermosensitive recording material according to claim 1, wherein the binder resin in the under layer comprises a first binder resin and a second binder resin,
wherein the first binder resin is one of urethane resin and polyvinyl alcohol containing a carboxyl group, and
wherein the second binder resin is one of the styrene-butadiene-based copolymer resin or an acrylic resin containing a carboxyl group.

9. A thermosensitive recording material, comprising:
a support;
an under layer;
a thermosensitive recording layer; and
a protective layer,
where the under layer, the thermosensitive recording layer, and the protective layer are provided in this order on at least one surface of the support,
wherein the support is synthetic paper, or a synthetic resin film,
wherein the under layer contains a binder resin, and hollow particles,
wherein an adhesive force of the thermosensitive recording material at −20° C. is 10.0 N/25 mm or greater, where the adhesive force is measured by cutting out the thermosensitive recording material into a sample having a width of 25 mm and a length of 30 cm, bonding one end of an outermost surface of the sample at the side of the thermosensitive recording layer above the support to a substrate by 8 cm in an environment of 22° C. and 50% RH, leaving the sample to stand in an environment of −20° C. to adjust temperature of the sample to −2020 C., pulling the other end of the sample in a 180 degrees direction with respect to the substrate, measuring a force (N/25 mm) at which the sample is peeled from the substrate by means of a digital force gauge, and determining a maximum value of the measured force at −20° C. as the adhesive force, wherein the protective layer contains a binder resin and a crosslinking agent, where the binder resin is polyvinyl alcohol containing a carboxyl group, and the crosslinking agent is polyamide epichlorohydrin, and wherein the binder resin in the under layer contains (i) an acrylic resin containing a carboxyl group and (ii) polyvinyl alcohol containing a carboxyl group.

10. A thermosensitive recording material, comprising:
a support;
an under layer;
a thermosensitive recording layer; and
a protective layer,
where the under layer, the thermosensitive recording layer, and the protective layer are provided in this order on at least one surface of the support,
wherein the support is synthetic paper, or a synthetic resin film,
wherein the under layer contains a binder resin, and hollow particles,
wherein an adhesive force of the thermosensitive recording material at −20° C. is 10.0 N/25 mm or greater, where the adhesive force is measured by cutting out the thermosensitive recording material into a sample having a width of 25 mm and a length of 30 cm, bonding one end of an outermost surface of the sample at the side of the thermosensitive recording layer above the support to a substrate by 8 cm in an environment of 22° C. and 50% RH, leaving the sample to stand in an environment of −20° C. to adjust temperature of the sample to −20° C., pulling the other end of the sample in a 180 degrees direction with respect to the substrate, measuring a force (N/25 mm) at which the sample is peeled from the substrate by means of a digital force gauge, and determining a maximum value of the measured force at −20° C. as the adhesive force, wherein the binder resin in the under layer comprises a first binder resin and a second binder resin, and wherein the first binder resin is urethane resin, and the second binder resin is a styrene-butadiene-based copolymer resin.

* * * * *